(12) United States Patent
Kim et al.

(10) Patent No.: US 10,719,155 B2
(45) Date of Patent: Jul. 21, 2020

(54) TOUCH DISPLAY DEVICE, GATE DRIVING CIRCUIT AND METHOD FOR DRIVING THEREOF

(71) Applicant: LG Display Co., Ltd., Seoul (KR)

(72) Inventors: CheolSe Kim, Daegu (KR); BuYeol Lee, Gyeonggi-do (KR); JuHan Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 72 days.

(21) Appl. No.: 16/113,598

(22) Filed: Aug. 27, 2018

(65) Prior Publication Data

US 2019/0073074 A1 Mar. 7, 2019

(30) Foreign Application Priority Data

Sep. 7, 2017 (KR) .................. 10-2017-0114764

(51) Int. Cl.
*G06F 3/041* (2006.01)
*G06F 3/044* (2006.01)
*G09G 3/20* (2006.01)
G09G 3/3266 (2016.01)
G09G 3/36 (2006.01)

(52) U.S. Cl.
CPC ............ *G06F 3/0412* (2013.01); *G06F 3/044* (2013.01); *G06F 3/0416* (2013.01); *G09G 3/2092* (2013.01); *G09G 3/3266* (2013.01); *G09G 3/3674* (2013.01); *G09G 2310/0286* (2013.01); *G09G 2310/067* (2013.01); *G09G 2310/08* (2013.01)

(58) Field of Classification Search
CPC ...... G06F 3/0412; G06F 3/044; G06F 3/0416; G09G 3/2092; G09G 2310/067; G09G 3/3674; G09G 2310/08; G09G 2310/0286; G09G 3/3266
See application file for complete search history.

(56) References Cited

U.S. PATENT DOCUMENTS

| | | | | |
|---|---|---|---|---|
| 2006/0221041 A1* | 10/2006 | Cho | .......................... | G09G 3/20 345/100 |
| 2006/0221042 A1* | 10/2006 | Cho | .......................... | G09G 3/20 345/100 |
| 2006/0227094 A1* | 10/2006 | Park | ...................... | G09G 3/3677 345/100 |
| 2010/0238122 A1* | 9/2010 | Chang | ................... | G06F 3/0412 345/173 |

(Continued)

*Primary Examiner* — Benyam Ketema
(74) *Attorney, Agent, or Firm* — Fenwick & West LLP

(57) ABSTRACT

The present disclosure provides a touch display panel or a touch display device and a gate driving circuit included in the touch display panel or the touch display device. The gate driving circuit includes a shift register group outputting scan signals during a display driving period and a dummy shift register group outputting dummy signal during a touch driving period. The gate driving circuit transmits a signal output immediately before a display driving period before a touch driving period ends, through dummy shift registers during the touch driving period such that the signal is used for outputting a first scan signal in the next display driving period. Accordingly, it is possible to prevent output reduction of a scan signal at the boundary between the touch driving period and the display driving period and prevent defect in an image due to the output reduction.

15 Claims, 15 Drawing Sheets

(56) References Cited

U.S. PATENT DOCUMENTS

2013/0169609 A1* 7/2013 Son .................. G11C 19/28
  345/209
2016/0379586 A1* 12/2016 Wu .................. G06F 3/044
  345/174

* cited by examiner

TOUCH DISPLAY DEVICE, GATE DRIVING CIRCUIT AND METHOD FOR DRIVING THEREOF

CROSS-REFERENCE TO RELATED APPLICATION

This application claims priority to Republic of Korea Patent Application No. 10-2017-0114764, filed on Sep. 7, 2017, which is hereby incorporated by reference in its entirety.

BACKGROUND

1. Field of the Disclosure

The present disclosure relates to a touch display device, a gate driving circuit, and a method for driving the gate driving circuit.

2. Description of the Prior Art

As the demands by users for display devices that display images increase, various display devices such as a liquid crystal display, a plasma display device, and an organic light emitting display are used.

In order to provide various functions, recently, display devices provide a function of recognizing touch on a display panel by a user and processing input from the user on the basis of the recognized touch.

Accordingly, such a touch display device provides both of a function of displaying images on touch display panel and a function of recognizing a touch by a user on the touch display panel.

Such a touch display device, in order to provide both of the display function and the touch function, may set a period (e.g., a blank period) between display driving periods for displaying images as touch driving period and perform an operation for sensing touch by a user during the touch driving period.

Since touch driving is performed for the blank period between the display driving periods, there may be a problem that the touch driving time for sensing touch may be insufficient.

Further, there is a problem that when two or more touch driving periods are inserted (designated) in one frame, the display driving may be influenced by the two or more touch driving period in one frame.

SUMMARY OF THE DISCLOSURE

An aspect of the present disclosure provides a touch display panel and a touch display device that can efficiently perform display driving and touch driving.

Another aspect of the present disclosure is to provide a touch display panel and a touch display device that perform gate driving that enables efficient display driving and touch driving.

Another aspect of the present disclosure is to provide a touch display panel and a touch display device that prevent deterioration of display performance during a touch driving period between display driving periods even if display driving and touch driving are time-divisionally performed.

In accordance with an aspect of the present disclosure, there is provided a touch display device including a plurality of gate lines and a gate driving circuit for driving the plurality of gate lines.

The gate driving circuit of the touch display device includes: a first shift register group sequentially outputting scan signals to gate lines of a first group of the plurality of gate lines during a first display driving period; a dummy shift register group receiving one or more signals output from the first shift register group and outputting dummy signals during a touch driving period after the first display driving period; and a second shift register group receiving one or more signals output from the dummy shift register group and sequentially outputting scan signals to gate lines of a second group of the plurality of gate lines during a second display driving period after the touch driving period.

In accordance with another aspect of the present disclosure, there is provided a touch display device including: a touch display panel including a plurality of gate lines, a plurality of touch lines, and a plurality of touch electrodes thereon; and a gate driving circuit outputting scan signals to the plurality of gate lines.

In the touch display device, the gate driving circuit sequentially outputs scan signals to the plurality of gate lines while display driving voltage is applied to the touch display panel, and sequentially outputs dummy signals while touch driving signals are applied to the plurality of touch electrodes.

In accordance with another aspect of the present disclosure, there is provided a gate driving circuit including: a shift register group sequentially outputting scan signals to some of a plurality of gate lines disposed on a touch display panel during a display driving period; and a dummy shift register group receiving one or more signals output from the shift register group and outputting dummy signals during a touch driving period after the display driving period.

The gate driving circuit may be operated through a step of sequentially outputting scan signals to two or more gate lines disposed in a first area of a touch display panel during a first display period; a step of sequentially outputting dummy signals during a touch driving period after the first display driving period; and a step of sequentially outputting scan signals to two or more gate lines disposed in a second area of the touch display panel during a second display driving period after the touch driving period.

According to embodiments of the present disclosure, since touch sensing is performed by inserting a touch driving period between display driving periods in one frame, it is possible to secure sufficient time for sensing touch.

According to embodiments of the present disclosure, since signals output from shift registers, which are used to output scan signals in a display driving period, are transmitted through dummy shift registers during a touch driving period and are used for outputting scan signals during the next display driving period, it is possible to prevent reduction of output of scan signals that are output in a display driving period after the touch driving period.

Accordingly, it is possible to prevent deterioration of the display performance in the touch driving period even though a touch driving period is inserted between display driving periods.

BRIEF DESCRIPTION

The above and other aspects, features and advantages of the present disclosure will be more apparent from the following detailed description taken in conjunction with the accompanying drawings, in which.

Figure 5:
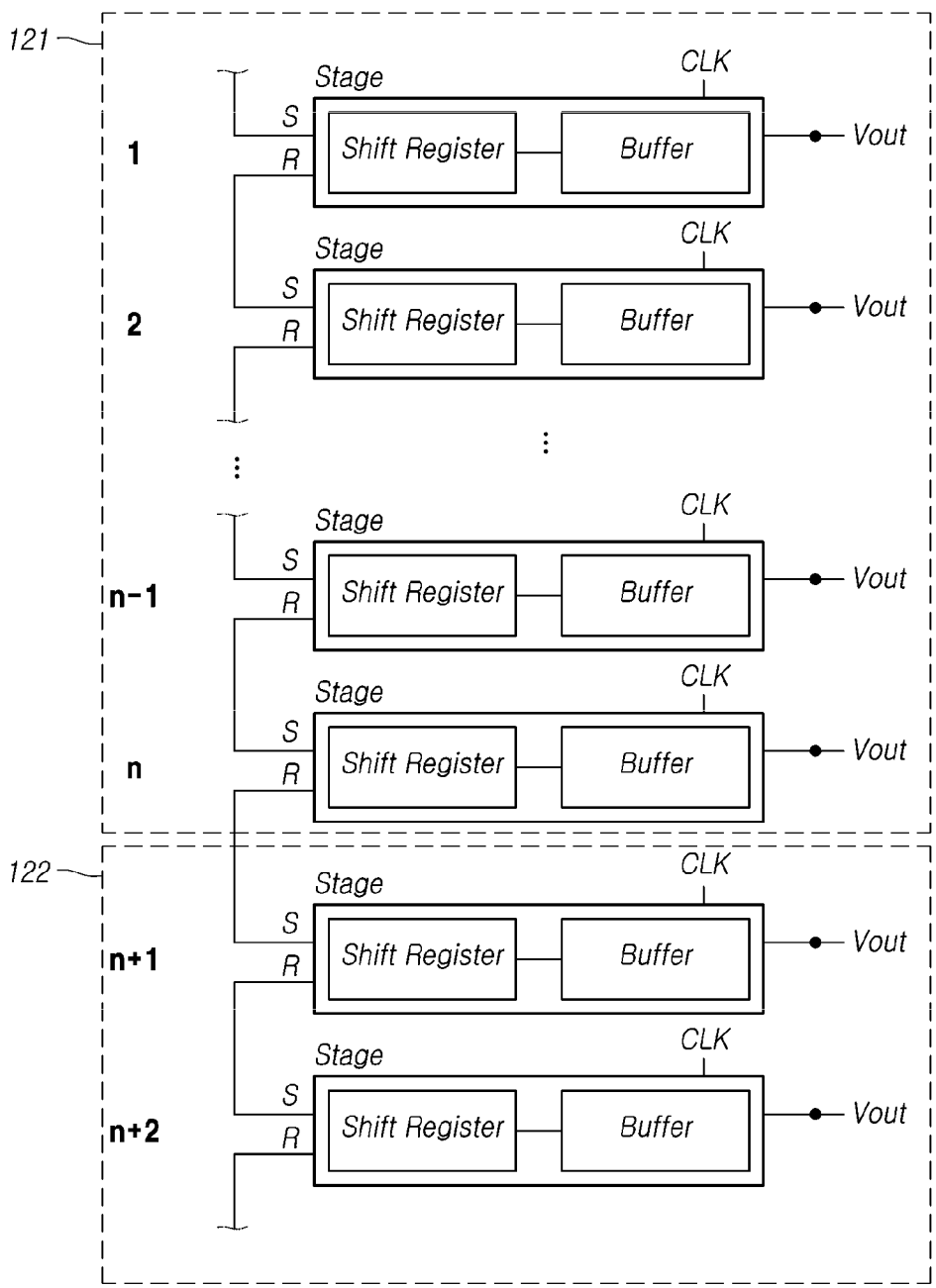
FIG. 5 is a diagram showing an example of a plurality of stages constituting the gate driving circuit shown in FIG. 3 according to embodiments of the present disclosure.
Figure 6:
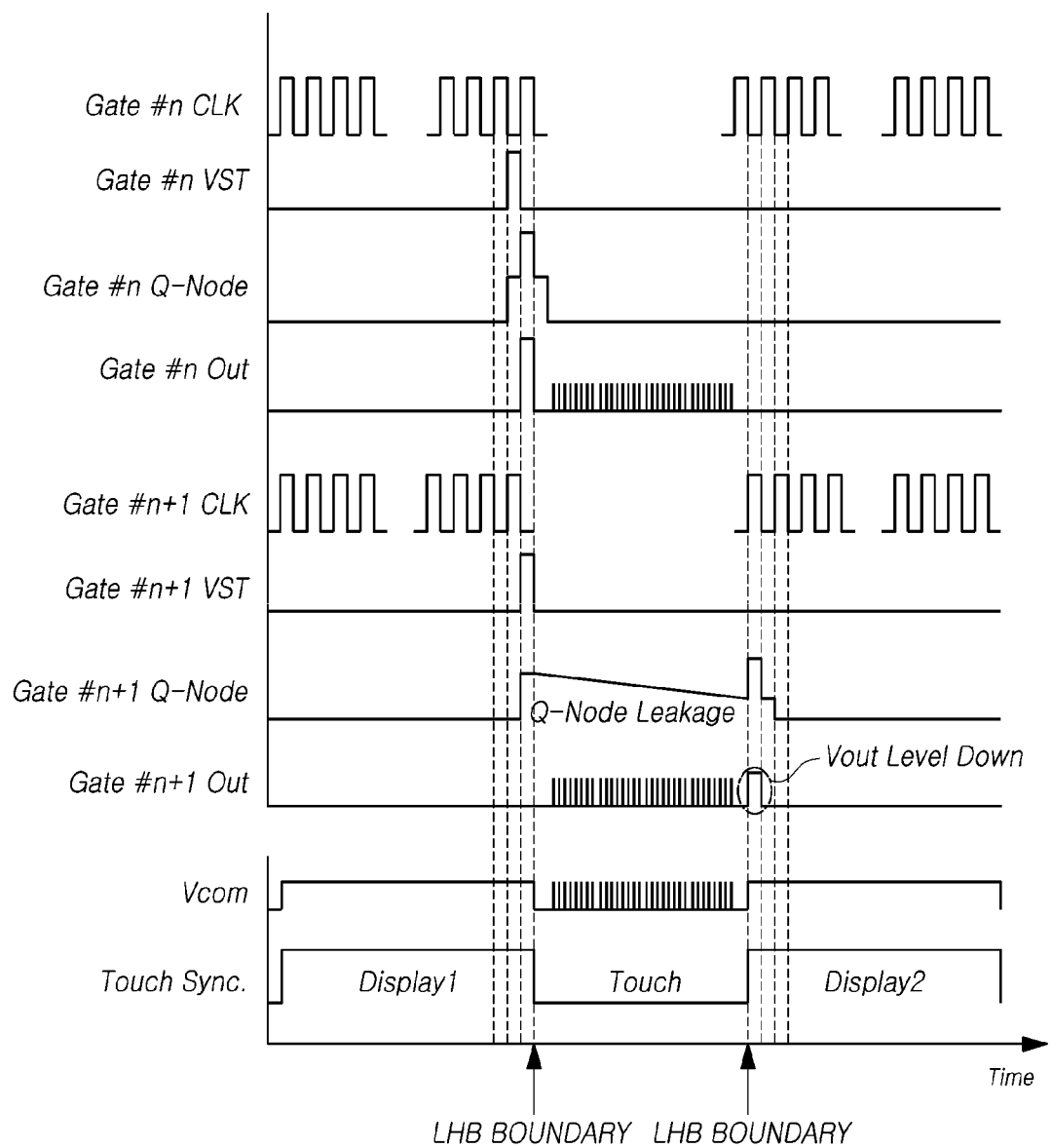
Figure 7:
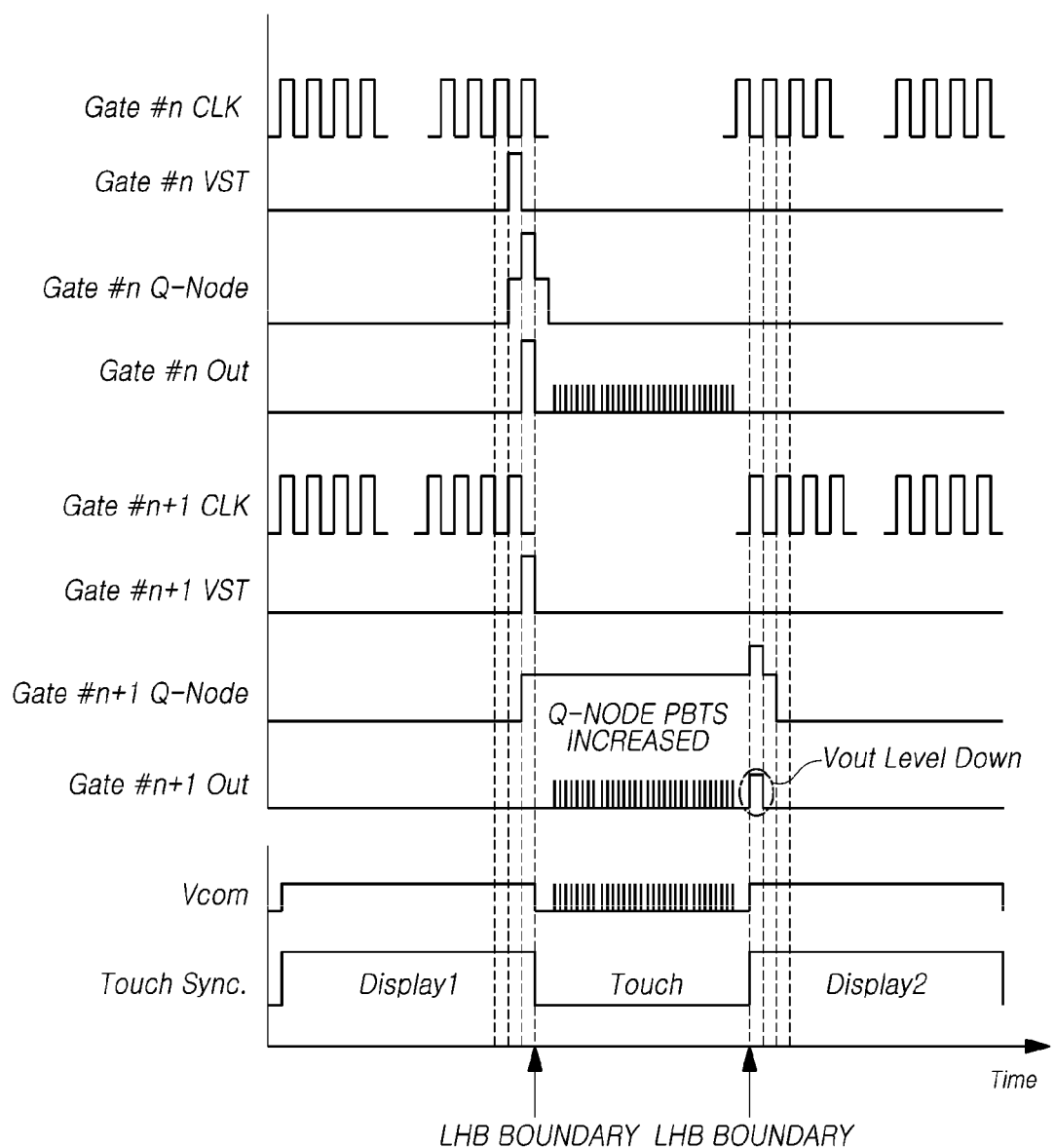
Figure 8:
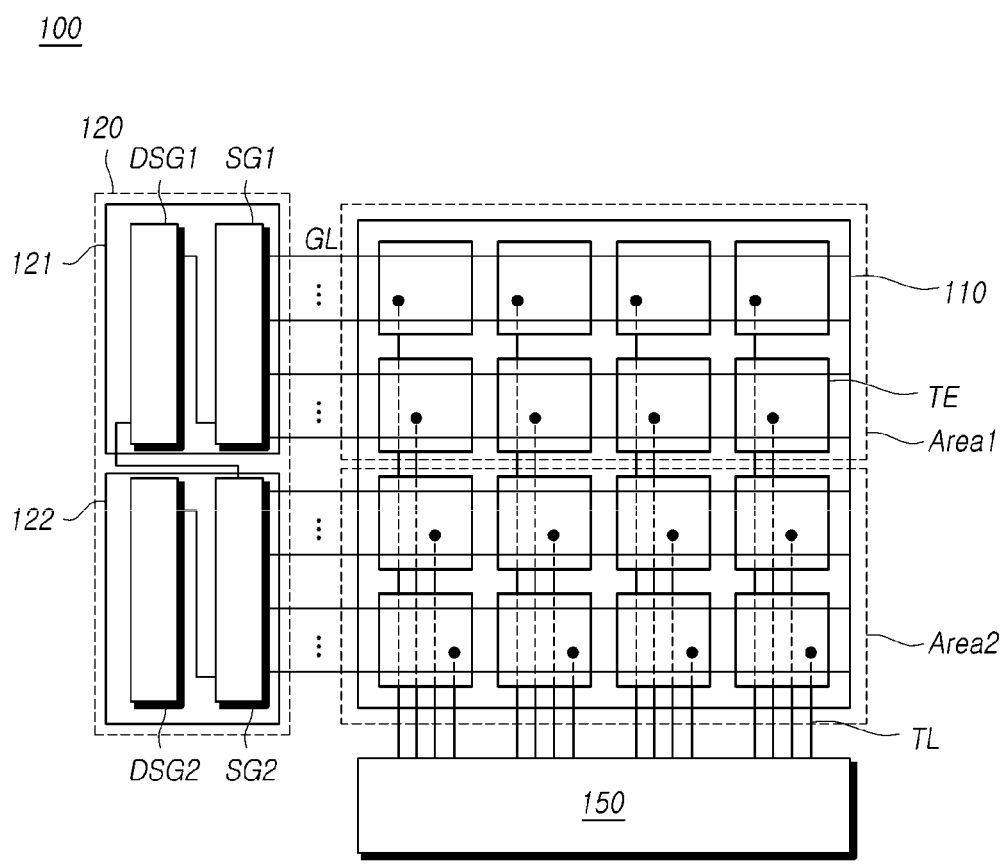
Figure 9:
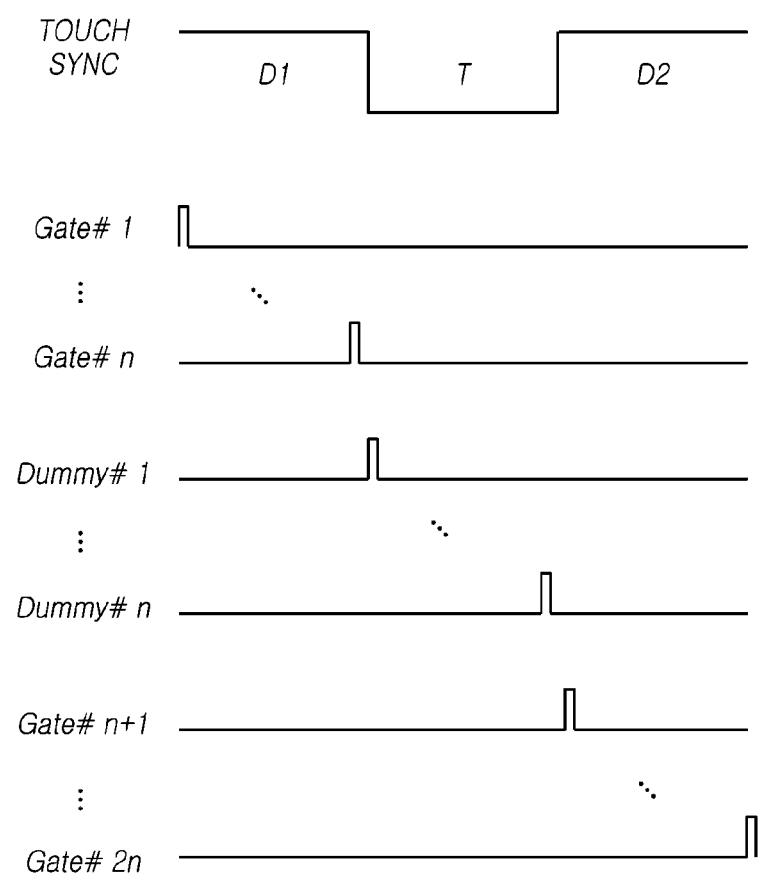
Figure 10:
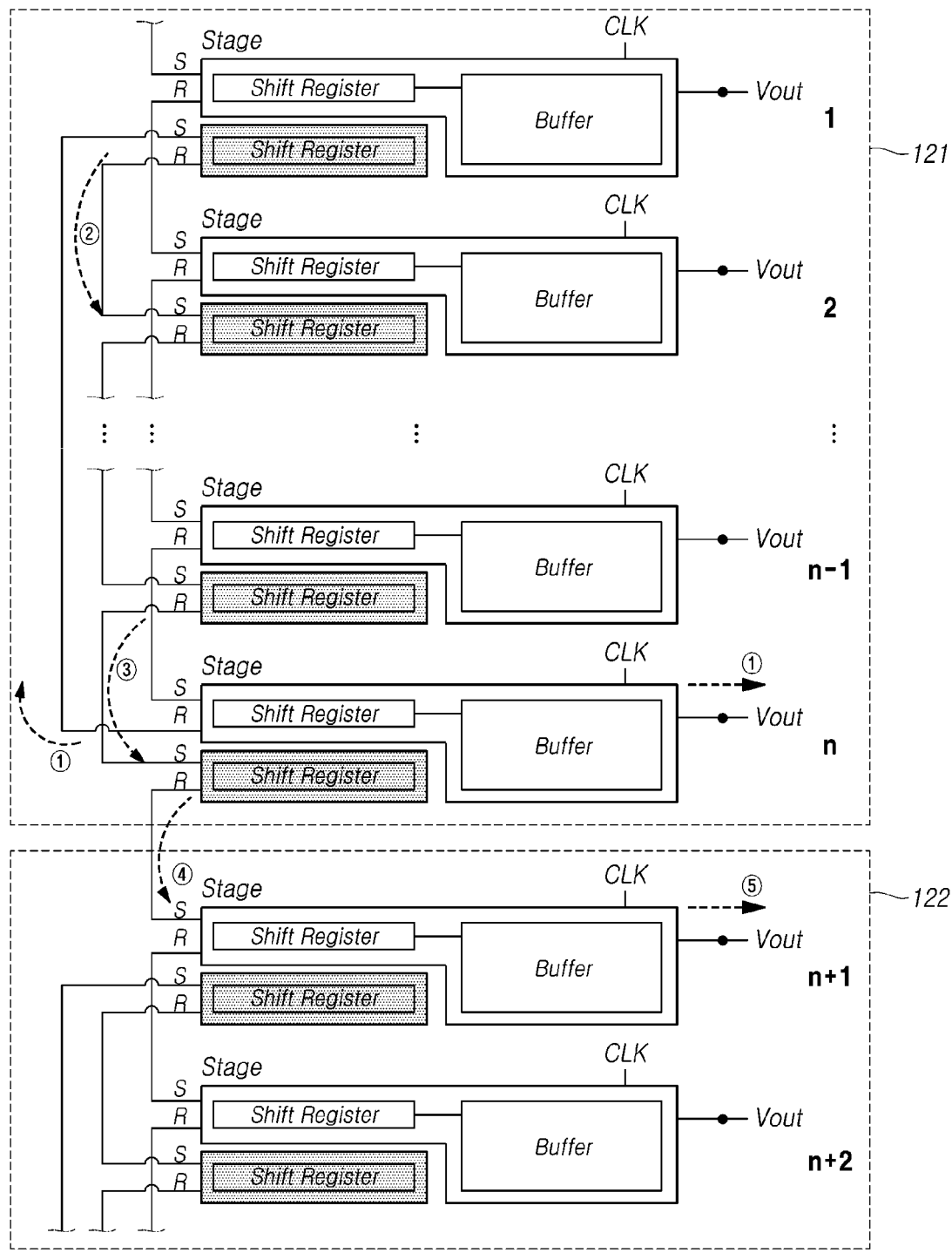
Figure 11:
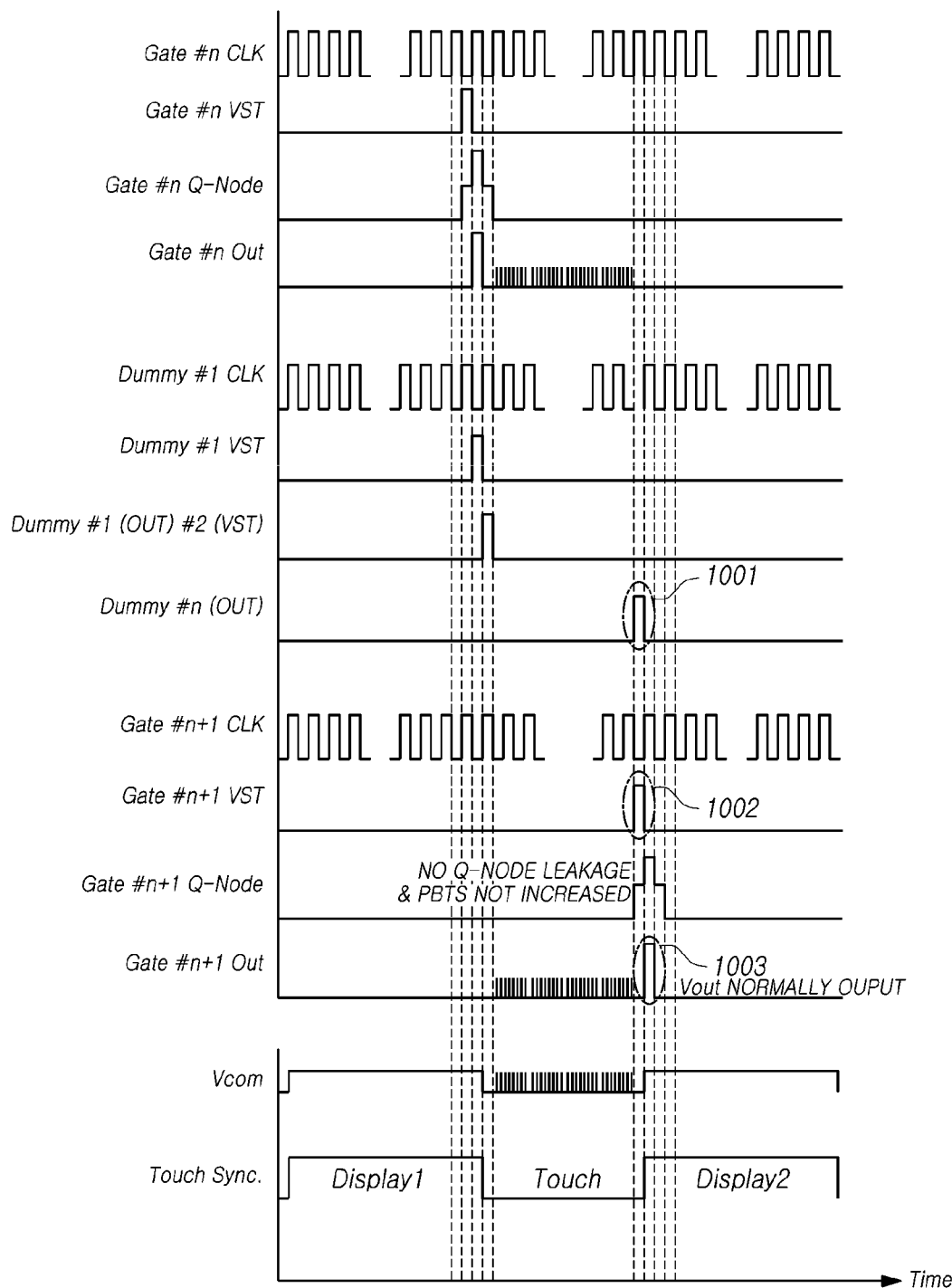
Figure 12:
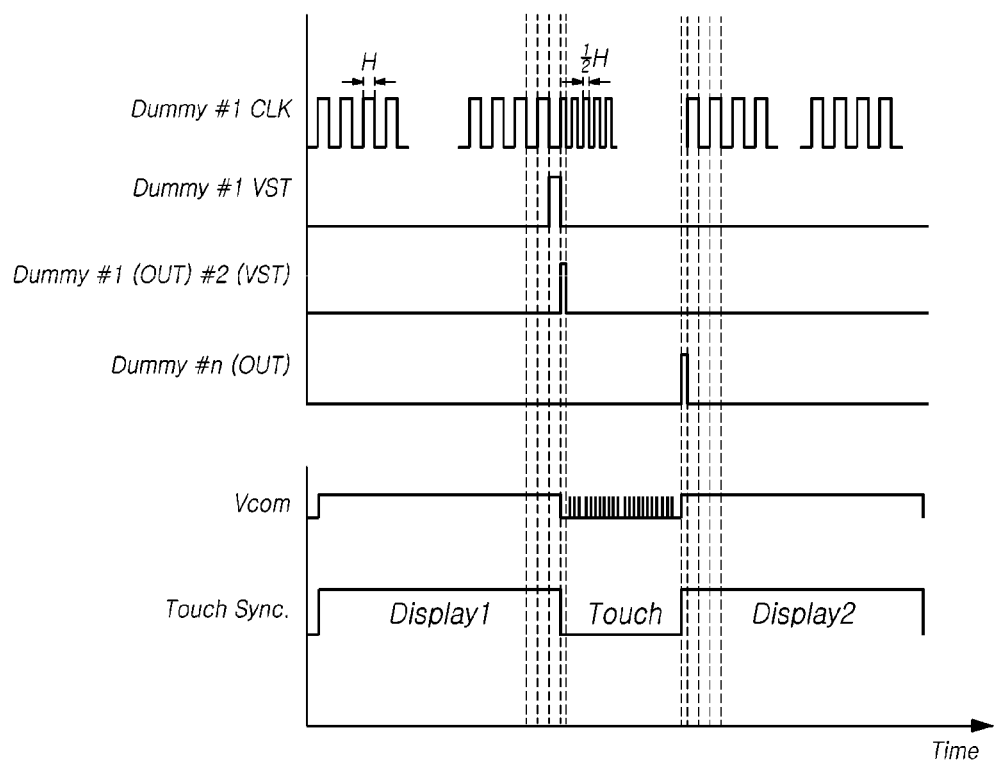
Figure 13:
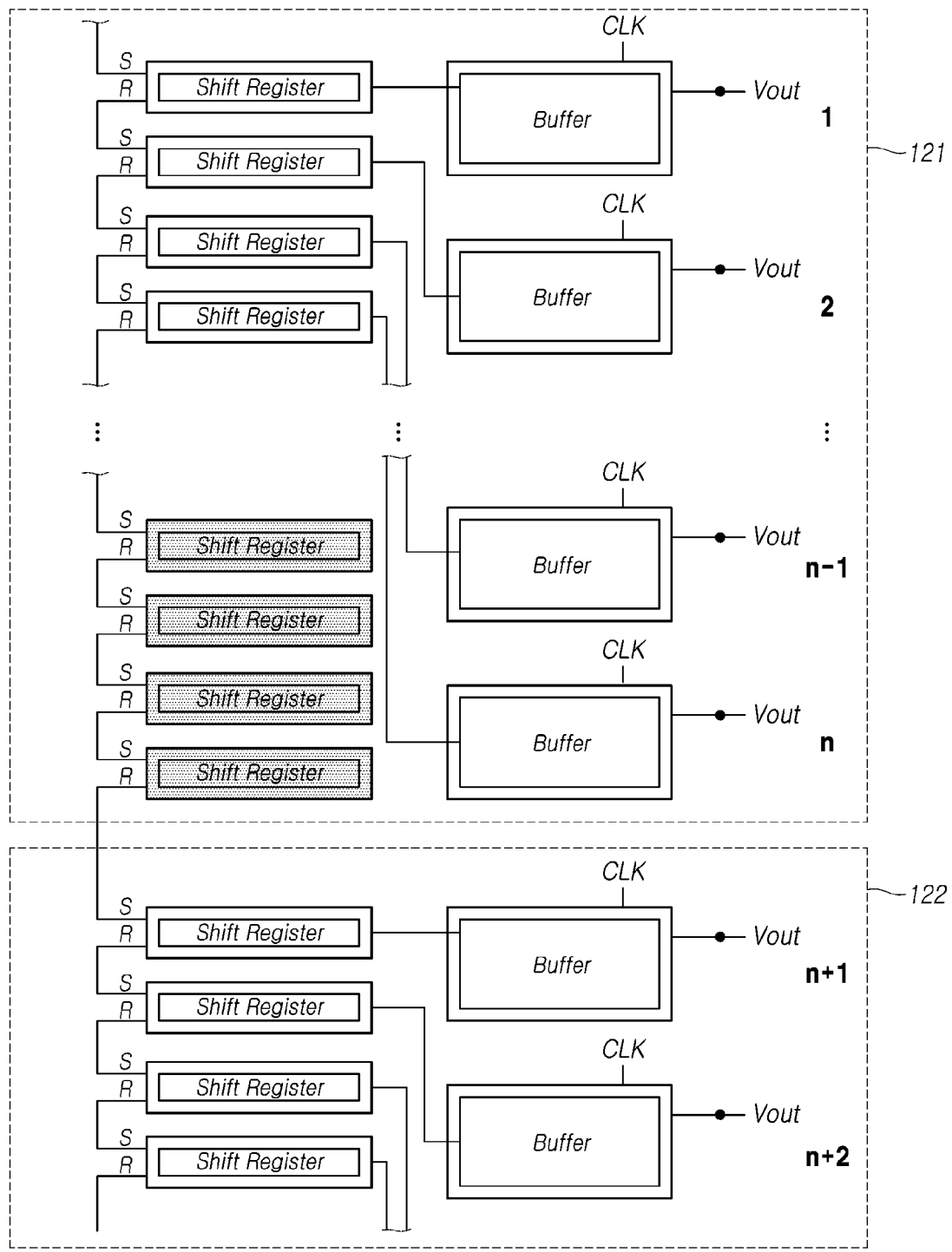
Figure 14:
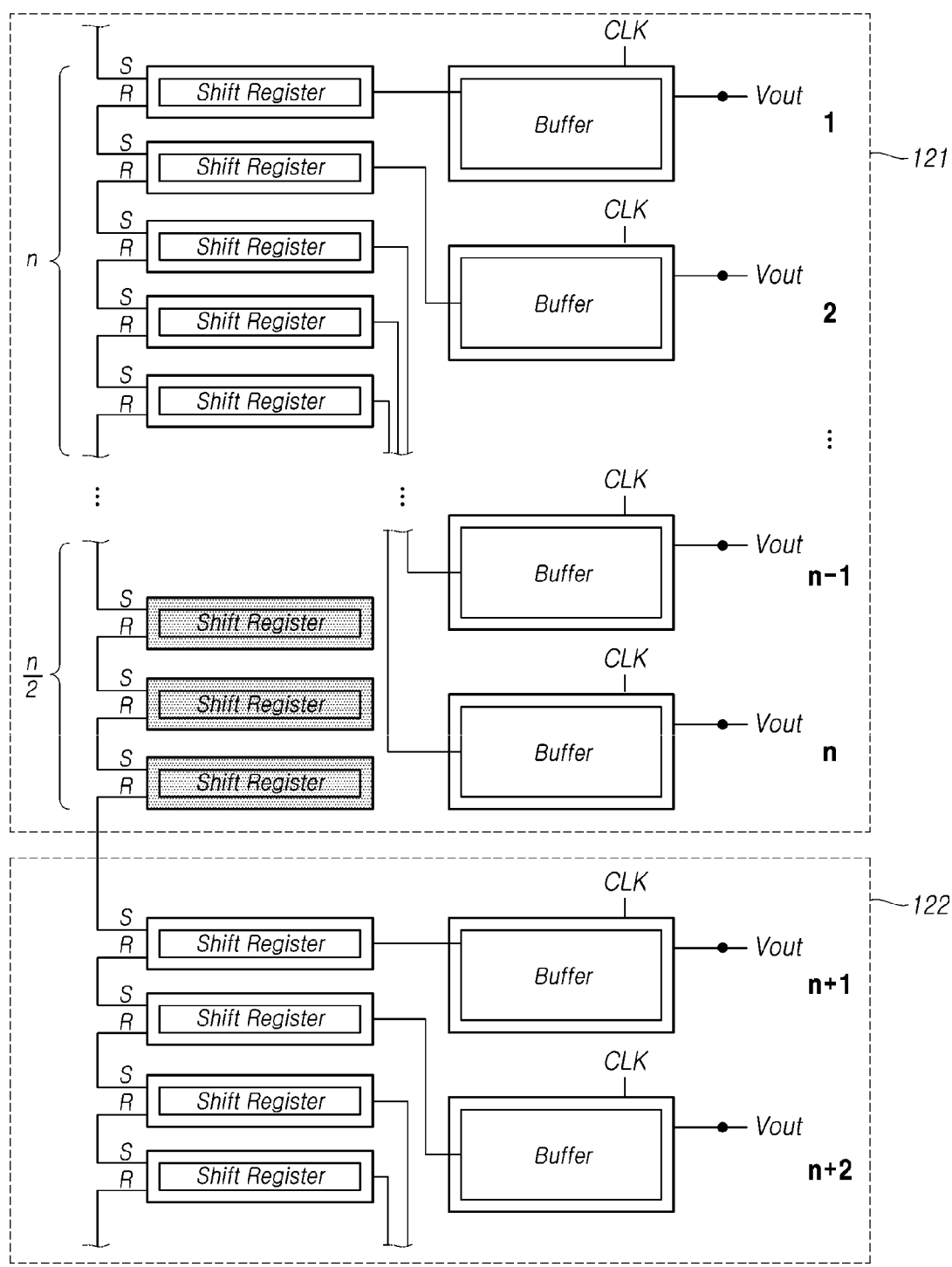
Figure 15:
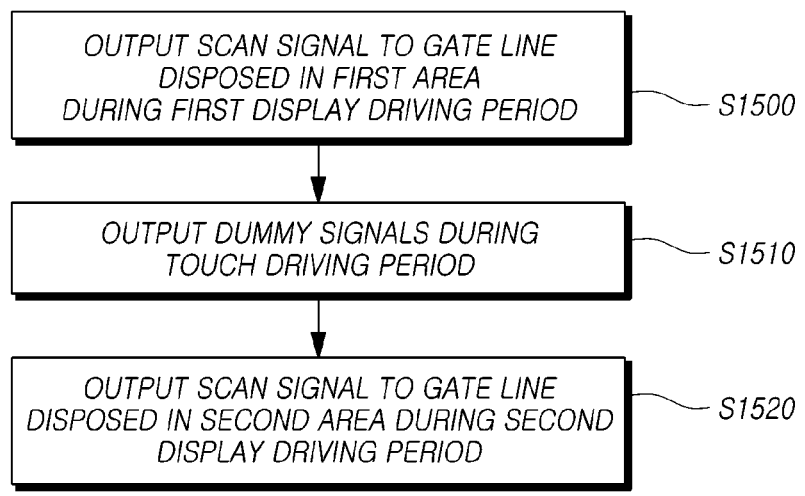

FIGS. 6 and 7 diagrams showing an example of scan signals that are output from a plurality of stages shown in FIG. 5 according to embodiments of the present disclosure;

FIG. 8 is a diagram showing another example of the configuration of a gate driving circuit when display driving and touch driving are time-divisionally performed in the touch display device according to embodiments of the present disclosure;

FIG. 9 is a diagram showing an example of timings of scan signals and dummy signals output by the gate driving circuit shown in FIG. 8 according to embodiments of the present disclosure;

FIG. 10 is a diagram showing an example of stages and dummy shift registers that constitute the gate driving circuit shown in FIG. 8 according to embodiments of the present disclosure;

FIG. 11 is a diagram showing an example of signals output from the stages and the dummy shift registers shown in FIG. 10 according to embodiments of the present disclosure;

FIG. 12 is a diagram showing another example of signals output the dummy shift registers shown in FIG. 10 according to embodiments of the present disclosure;

FIGS. 13 and 14 show other examples of the stages and dummy shift registers constituting the gate driving circuit shown in FIG. 8 according to embodiments of the present disclosure; and FIG. 15 shows the process of a method for driving the gate driving circuit according to embodiments of the present disclosure.

DETAILED DESCRIPTION

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 1:
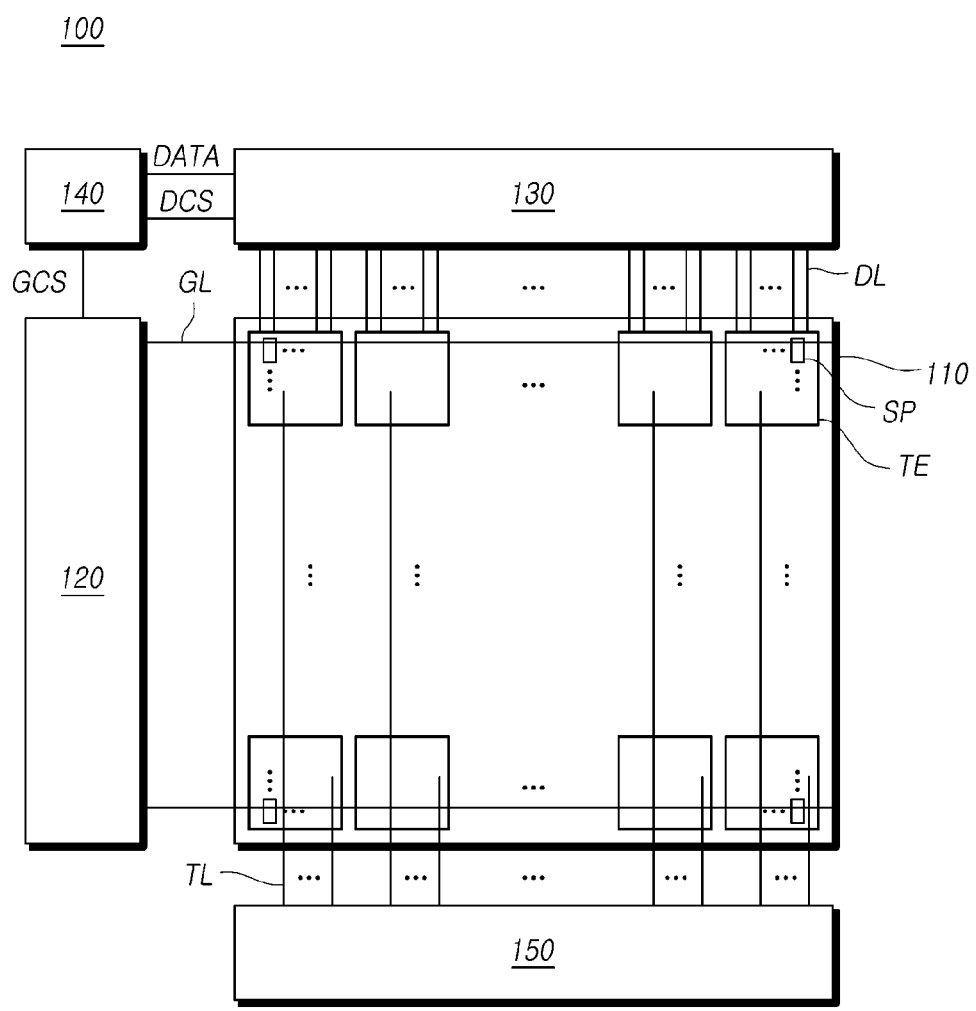
FIG. 1 is a diagram schematically showing the configuration of a touch display device according to embodiments of the present disclosure.

FIG. 1 is a diagram schematically showing the configuration of a touch display device 100 according to embodiments of the present disclosure.

Referring to FIG. 1, the touch display device 100 according to embodiments of the present disclosure includes a touch display panel 110, a gate driving circuit 120, a data driving circuit 130, a controller 140, and a touch driving circuit 150.

A plurality of gate lines GL, a plurality of data lines DL, and a plurality of subpixels SP for display driving may be disposed on the touch display panel 110. Further, a plurality of touch electrodes TE and a plurality of touch lines TL for touch sensing may be disposed on the touch display panel 110.

The gate driving circuit 120 controls the driving timing of the subpixels SP on the touch display panel 110 by outputting a scan signal to the gate lines GL.

The gate driving circuit 120 is controlled by the controller 140 to sequentially drive the gate lines GL by sequentially supplying scan signals of an ON-voltage or an OFF-voltage to the gate lines GL.

The gate driving circuit 120 may be disposed only at a side or at both sides of the touch display panel 110, depending on the driving method.

The gate driving circuit 120 may include one or more gate driver integrated circuit.

The gate driver integrated circuits each may be connected to a bonding pad of the touch display panel 110 in a tape automated bonding (TAB) type or a chip-On-glass (COG) type, or may be implemented in a gate-in-panel (GIP) type and directly disposed on the touch display panel 110.

Further, the gate driver integrated circuits may be integrated and disposed on the touch display panel 110 and may be implemented in a chip-on-film (COF) type mounted on a film connected to the touch display panel 110.

The data driving circuit 130 makes the subpixels SP show brightness according to image data by outputting data voltage to the data lines DL at the timing at which scan signals are applied through the gate lines GL.

The data driving circuit 130 drives the data lines DL by converting image data received from the controller 140 into analog type of data voltage and supplying the data voltage to the data lines DL when a specific gate line GL is opened.

The data driving circuit 130 can drive the data lines DL by including one or more source driver integrated circuits.

The source driver integrated circuits each may be connected to the bonding pad of the touch display panel 110 in a TAB type or the COG type, or may be directly disposed on the touch display panel 110, or may be integrated and disposed on the touch display panel 110.

The source driver integrated circuits may be implemented in the COF type. In this case, an end of each of the source driver integrated circuits is bonded to one or more source printed circuit board and the other end is bonded to the touch display panel 110.

The controller 140 supplies various control signals to the gate driving circuit 120 and the data driving circuit 130 and controls the operations of the gate driving circuit 120 and the data driving circuit 130.

The controller 140 starts scanning in accordance with a timing implemented by each frame, outputs converted image data by converting input image data received from the outside to fit to the data signal format that is used by the data driving circuit 130, and controls data driving at predetermined time in accordance with scanning.

The controller 140 receives various timing signals such as a vertical synchronization signal Vsync, a horizontal synchronization signal Hsync, an input data enable signal DE, and a clock signal CLK with input image data from the outside (e.g., a host system).

In addition to converting input image data from the outside to fit to the data signal format that is used by the data driving circuit 130 and then outputting the converted image, the controller 140 generates various control signals using input timing signals and outputs the controls signals to the gate driving circuit 120 and the data driving circuit 130 to control the gate driving circuit 120 and the data driving circuit 130.

For example, the controller 140 outputs various gate control signals GCS including a gate start pulse GSP, a gate shift clock GSC, and a gate output enable signal GOE to control the gate driving circuit 120.

The gate start pulse GSP controls the operation start timings of one or more gate driver integrated circuits of the gate driving circuit 120. The gate shift clock GSC, which is a clock signal that is commonly input to one or more gate driver integrated circuits, controls shift timings of scan signals. The gate output enable signal GOE designates timing information of one or more gate driver integrated circuits.

The controller 140 output various data control signals DCS including a source start pulse SSP, a source sampling clock SSC, and a source output enable signal SOE in order to control the data driving circuit 130.

The source start pulse SSP controls the sampling start timings of one or more source driver integrated circuits of the data driving circuit 130. The source sampling clock SSC is a clock signal that controls the sampling timing of data in the source driver integrated circuits. The source output enable signal SOE controls the output timing of the data driving circuit 130.

The controller 140 may be disposed on a control printed circuit board connected through a connection medium such as a source printed circuit board to which a source driver integrated circuit is bonded and a flexible flat cable (FFC) or a flexible printed circuit (FPC).

A power controller that supplies various voltages or currents to the touch display panel 110, the gate driving circuit 120, data driving circuit 130 or controls various voltage or currents to supply. The power controller is also called a power management integrated circuit.

The touch display device 100 according to embodiments of the present disclosure may include a plurality of touch electrodes TE, a plurality of touch lines TL disposed on the touch display panel 110, and the touch driving circuit 150 driving the touch electrodes TE and the touch lines TL in order to sense touch by a user on the touch display panel 110.

Figure 2:
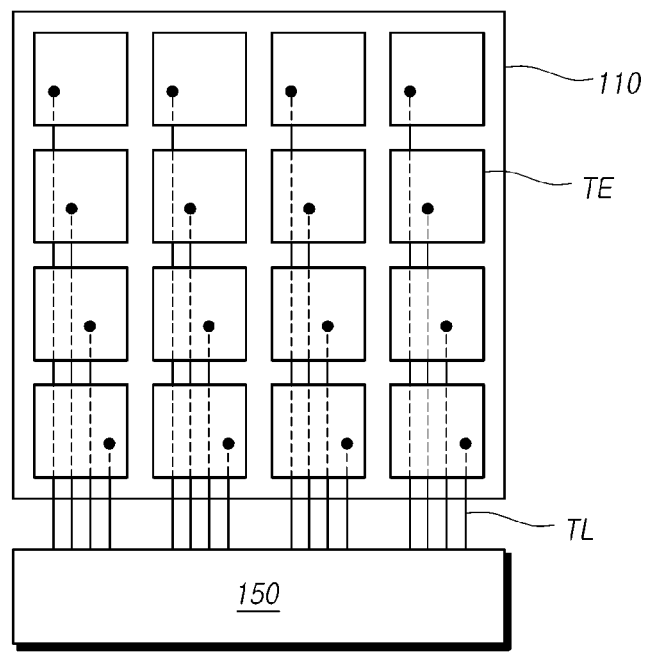
FIG. 2 is a diagram showing an example of a configuration for touch sensing in the touch display device according to embodiments of the present disclosure.

FIG. 2 is a diagram showing an example of a configuration for touch sensing in the touch display device 100 according to embodiments of the present disclosure.

Referring to FIG. 2, a plurality of touch electrodes TE and a plurality of touch lines TL are disposed on the touch display panel 110 of the touch display device 100 according to embodiments of the present disclosure.

The touch electrodes TE may be disposed in or on the touch display panel 110.

For example, when the touch display device 100 is a liquid crystal display device, common electrodes to which common voltage Vcom is applied in display driving may be used as the touch electrodes TE. In this case, display driving voltage can be applied to the touch electrodes TE in display driving and a touch driving signal can be applied to the touch electrodes TE in touch driving.

That is, as in an in-cell type or an on-cell type, when a touch screen panel (i.e., touch electrodes) is disposed in a display panel, electrodes (e.g., common electrodes) used for display driving may be used as touch electrodes TE. In this case, one electrode has to function as both of a display driving electrode (e.g., a common electrode) and a touch electrode TE, so display driving for displaying images and touch driving for touch sensing should be time-divisional periods.

Alternatively, when the touch display device 100 is an organic light emitting display device, the touch electrodes TE may be disposed on an encapsulation layer on an organic light emitting diode. The touch electrodes TE may be disposed in a film touch sensor type on the encapsulation layer.

The touch electrodes TE may be each connected to one touch line TL and they may be separated from each other. Alternatively, a TX electrode to which a touch driving signal output from the touch driving circuit 150 and an RX electrode used for receiving a touch sensing signal in the touch driving circuit 150 may be disposed to cross each other.

The touch lines TL is disposed on the touch display panel 110 and connects the touch electrodes TE to the touch driving circuit 150.

For example, the touch lines TL may be disposed in areas overlapping the touch electrodes TE and may be connected to the touch electrodes TE through contact holes. The touch lines TL may be each connected to any one touch electrode TE and they may overlap each other in a state insulated from other touch electrodes TE.

Alternatively, the touch lines TL may be disposed around the outer edge area of the touch display panel 110 and connected to the touch electrodes TE.

The touch driving circuit 150 applies a touch driving signal to the touch electrodes TE and senses touch by a user on the touch display panel 110 by receiving a touch sensing signal during a touch driving period.

The touch driving circuit 150 can sense whether a user touches the touch display panel and the touch position by sensing a change of capacitance that is generated when a user touches the touch display panel 110 and can detect touch by a user through self-cap sensing or mutual cap-sensing. Alternatively, it may be possible to sense touch by a user by alternately performing the self-cap sensing and the mutual-cap sensing.

When the touch driving circuit 150 senses touch through the self-cap sensing, it can sense touch by a user by outputting a touch driving signal through the touch lines TL connected to the touch electrodes TE and receiving a touch sensing signal through a corresponding touch line TL.

When the touch driving circuit 150 senses touch through the mutual-cap sensing, it can sense touch by a user by outputting a touch driving signal through the TX electrode of the touch electrodes TE and receiving a touch sensing signal through a touch line TL connected to the RX electrode.

The touch driving circuit 150 can sense touch on the touch display panel 110 by a user by driving the touch electrodes TE during a touch driving period time-divided from the display driving period.

For example, it is possible to perform an operation for touch sensing (a V-Blank sensing method) during a vertical blank (V-Blank) period between periods in which display is driven. In this case, it is possible to sense touch by a user under minimized influence on display driving, but the period for touch sensing may not be sufficient.

Accordingly, display driving and touch driving can be performed together and the period for touch sensing can be sufficiently secured by time-dividing one frame period into a display driving period and a touch driving period.

Figure 3:
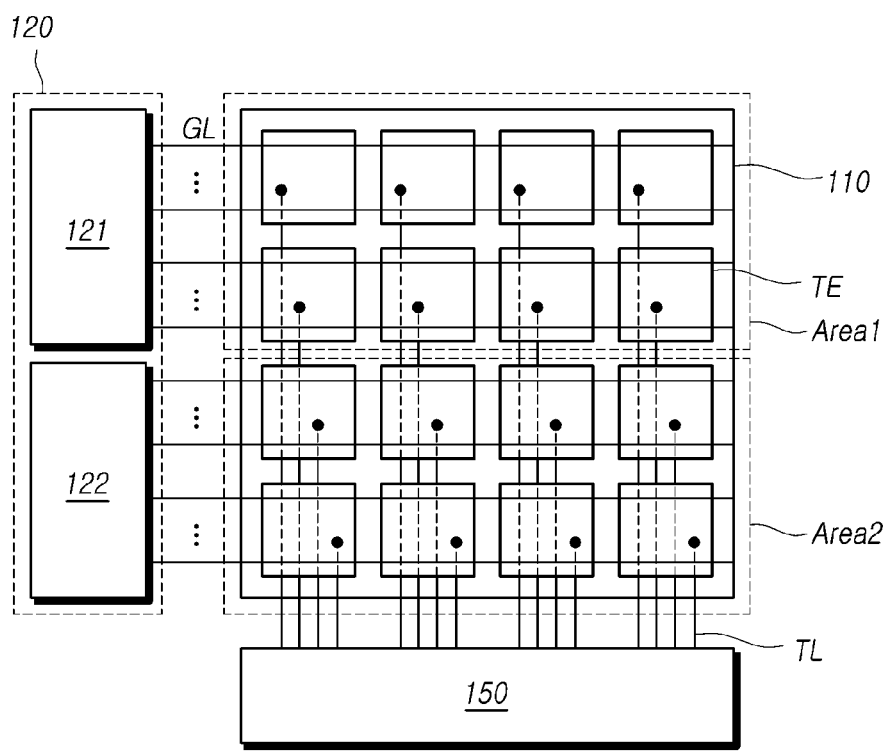
FIG. 3 is a diagram showing an example of the configuration of a gate driving circuit when display driving and touch driving are time-divisionally performed in the touch display device according to embodiments of the present disclosure.

FIG. 3 shows an example the gate driving circuit 120 and a configuration for touch driving when a display driving period and a touch driving period are time-divisionally performed in one frame in the touch display device 100 according to embodiments of the present disclosure.

Referring FIG. 3, the gate driving circuit 120 of the touch display device 100 may include a first gate driving circuit 121 driving gate lines GL disposed in a first area Area of the touch display panel 110 and a second gate driving circuit 122 driving gate lines GL disposed in a second area Area 2 of the touch display panel 110.

That is, the first gate driving circuit 121 can drive a first group of gate lines GL of the gate lines GL disposed on the touch display panel 110 and the second gate driving circuit 122 can drive a second group of gate lines GL of the gate lines GL.

FIG. 3 exemplifies a case in which the touch display panel 110 is divided into two areas and display driving and touch driving are performed, but it may be possible to divide the touch display panel 110 into two or more areas and perform display driving and touch driving.

The first gate driving circuit 121 sequentially outputs scan signals to the gate lines GL disposed in the first area Area 1 of the touch display panel 110 during a first display driving period.

When the first display driving period ends, the touch driving circuit 150 senses touch on the touch display panel 110 by outputting a touch driving signal to the touch electrodes TE disposed on the touch display panel 110 and receiving a touch sensing signal.

That is, it is possible to perform touch sensing in a horizontal blank (H-Blank) timing in one frame (a long horizontal blank (LHB) sensing method).

The touch driving circuit 150 may perform touch sensing for the first area Area 1 or the second area Area 2 or both of the areas of the touch display panel 110 during a touch driving period.

When the touch driving period ends, the second gate driving circuit 122 sequentially output scan signals to the gate lines GL disposed on the touch display panel 110 during a second display driving period.

Accordingly, by dividing a period in which display driving is performed for one frame and performing touch sensing between the divided periods, a period for touch sensing can be sufficiently secured, as compared with the method of sensing touch during a vertical blank period between frames.

Figure 4:
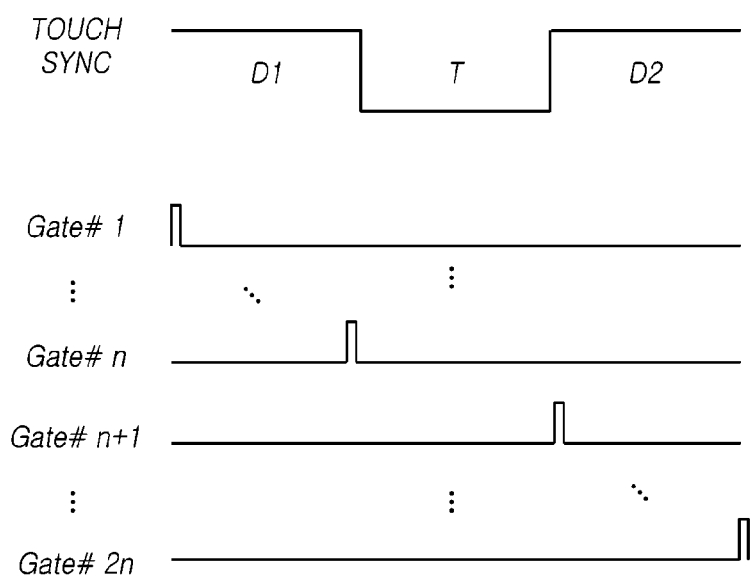
FIG. 4 is a diagram showing an example of timings of scan signals output by the gate driving circuit shown in FIG. 3 according to embodiments of the present disclosure.

FIG. 4 shows an example of timing at which the gate driving circuit 120 shown in FIG. 3 according to embodiments of the present disclosure outputs scan signals, in which n gate lines GL are disposed in the first area Area 1 of the touch display panel 110 and n gate lines GL are disposed in the second area Area 2.

Referring to FIG. 4, the first gate driving circuit 121 sequentially outputs scan signals from the first gate line GL to the n-th gate line GL disposed in the first area Area 1 of the touch display panel 110 during a first display driving period D1.

The first gate driving circuit 121 and the second gate driving circuit 122 do not output a scan signal during a touch driving period T after the first display driving period D1.

After the touch driving period T, the second gate driving circuit 122 sequentially outputs scan signals from the n+1-th gate line GL to the 2n-th gate line GL disposed in the second area Area 2 of the touch display panel 110 during the second display driving period D2.

The first gate driving circuit 121 and the second gate driving circuit 122 may be configured as a plurality of stages that outputs scan signals to the gate lines GL, respectively.

FIG. 5 shows an example of stages constituting the first gate driving circuit 121 and the second gate driving circuit 122 shown in FIG. 3 according to embodiments of the present disclosure.

Referring to FIG. 5, the first gate driving circuit 121 and the second gate driving circuit 122 each may include a plurality of stages connected to the gate lines GL, respectively.

That is, the first gate driving circuit 121 may include n stages connected to the n gate lines GL disposed in the first area Area 1 of the touch display panel 110 and the second gate driving circuit 122 may include n stages connected to the n gate lines GL disposed in the second area Area 2 of the touch display panel 110.

The stages each may include a shift register and a buffer.

The first stage disposed on the first gate driving circuit 121 receives a gate start signal and outputs a scan signal to the first gate line GL at the timing of an input clock signal CLK.

The shift register of the first stage transmits a signal to the shift register of the second stage at the timing at which the scan signal is output to the first gate line GL. The second stage outputs a scan signal to the second gate line GL, using the signal received from the shift register of the first stage as a start signal.

In this way, the n stages included in the first gate driving circuit 121 sequentially output scan signals to the n gate lines GL disposed in the first area Area 1 of the touch display panel 110.

The first stage (n+1-th stage) of the second driving circuit 122 received the signal output from the n-th stage of the first gate driving circuit 121 cannot immediately output a scan signal and has to hold a start signal until a touch driving period ends, because the touch driving period is started when the first display driving period ends.

Leakage occurs or stress is concentrated in the stage, so output of a scan signal of the first stage of the second gate driving circuit 122 may be reduced after the touch driving period.

FIGS. 6 and 7 show an example of scan signals that are output from the stages shown in FIG. 5 according to embodiments of the present disclosure.

Referring to FIGS. 6 and 7, when the n-th stage of the first gate driving circuit 121 outputs a scan signal (Gate # n Out), a start signal (Gate # n+1 VST) is input to the first stage of the second gate driving circuit 122.

The first stage of the second gate driving circuit 122 holds a start signal during a touch driving period (e.g. the touch driving period is a period when Touch Sync. Is a low level) and outputs a scan signal after the touch driving period ends.

Referring to FIG. 6, when amorphous silicon substrates (a-Si Backplanes) are used for the stages, leakage of Q-nodes of the stages occurs during the touch driving period, so boost trapping voltage of the first stage of the second gate driving circuit 122 is reduced.

Accordingly, current is reduced and output of a scan signal of the first stage of the second gate driving circuit 122 is decreased after the touch driving period.

Referring to FIG. 7, when an oxide substrates (oxide backplane) are used for the stages, stress at the Q-nodes is increased during the touch driving period, so the scan signal output of the first stage of the second gate driving circuit 122 is reduced due to positive shift by PBTS.

The reduction of the first scan signal output of the second gate driving circuit 122 causes horizontal line defect, so display driving is not normally performed after the touch driving period.

The touch display device 100 according to embodiments of the present disclosure provides a plan that can perform touch driving without influencing display driving by preventing reduction of output of a scan signal at the boundary between the display driving period and the touch driving period.

FIG. 8 shows another example of the gate driving circuit 120 when display driving and touch driving are performed in the LHB method in the touch display device 100 according to embodiments of the present disclosure.

Referring FIG. 8, the gate driving circuit 120 may include a first gate driving circuit 121 driving gate lines GL disposed in a first area Area 1 of the touch display panel 110 and a second gate driving circuit 122 driving gate lines GL disposed in a second area Area 2 of the touch display panel 110.

The first gate driving circuit 121 may include a first shift register group SG1 including stages sequentially outputting scan signals to the gate lines GL disposed in the first area Area 1 of the touch display panel 110, and a first dummy shift register group DSG1.

The second gate driving circuit 122 may include a second shift register group SG2 including stages sequentially outputting scan signals to the gate lines GL disposed in the second area Area 2 of the touch display panel 110, and a second dummy shift register group DSG2.

When the touch display panel 110 is divided into two areas for driving, the second dummy shift register group DSG2 may not be included.

That is, the first shift register group SG1 can output a scan signal for driving the gate lines GL of the first group of the gate lines GL disposed on the touch display panel 110 and the second shift register group SG2 can output scan signals for driving the gate lines GL of the second group.

The first shift register group SG1 of the first gate driving circuit 121 sequentially outputs scan signals to the gate lines GL disposed in the first area Area 1 of the touch display panel 110 during a first display driving period.

The last stage of the first shift register group SG1 outputs a signal to the first dummy shift register group DSG1 at the timing at which a scan signal is output.

That is, the first dummy shift register group DSG1 receives a signal output from the first shift register group SG1 immediately before the first display driving period ends.

The first dummy shift register group DSG1 may include a plurality of dummy shift registers and the number of the dummy shift registers included in the first dummy shift register group DSG1 may be the same as the number of the shift registers included in the first shift register group SG1.

The first dummy shift register group DSG1 outputs dummy signals obtained by shifting of the timings of signals received from the first shift register group SG1 during a touch driving period.

For example, the first dummy shift register (or two or more first dummy shift registers) included in the first dummy shift register group DSG1 receives a signal from the first shift register group SG1 immediately before a first display driving period ends.

The first dummy shift register of the first dummy shift register group DSG1 outputs a dummy signal obtained by shifting of the timing of a received signal to the second dummy shift register. In this way, signals are transmitted through the dummy shift registers during the touch driving period.

The last dummy shift register (or two or more second dummy shift registers) of the first dummy shift register group DSG1 outputs a signal to the second shift register group SG2 of the second gate driving circuit 122 immediately before the touch driving period ends.

The second shift register group SG2 outputs a first scan signal in a second display driving period, using the signal received from the first dummy shift register group DSG1 immediately before the touch driving period ends.

Accordingly, the second gate driving circuit 122 that drives the gate lines GL disposed in the second area Area 2 of the touch display panel 110 can output a scan signal using the signal received immediately before the second display driving period starts without holding the signal received from the first gate driving circuit 121 during the touch driving period.

Since the second gate driving circuit 122 does not need to hold a signal during the touch driving period, leakage does not occur or stress is not increased during the touch driving period, so output reduction of the first scan signal in the second display driving period can be prevented.

Further, the first dummy shift register group DSG1 operates using a signal output from the first shift register group SG1 without an additional specific input signal, the gate driving circuit 120 can be easily configured.

FIG. 9 shows an example of timings of scan signals and dummy signals output from the gate driving circuit 120 shown in FIG. 8 according to embodiments of the present disclosure.

Referring to FIG. 9, the first gate driving circuit 121 sequentially outputs scan signals from the first gate line GL to the n-th gate line GL disposed in the first area Area 1 of the touch display panel 110 during a first display driving period.

The first dummy shift register group DSG1 in the first gate driving circuit 121 sequentially outputs dummy signals that are not applied to the touch display panel 110 during the touch driving period after the first display driving period.

During the second display driving period after the touch driving period, the second gate driving circuit 122 outputs scan signals from the n+1-th gate line GL to the 2n-th gate line GL disposed in the second area Area 2 of the touch display panel 110.

Accordingly, the second shift register group SG2 of the second gate driving circuit 122 outputs scan signals, using signals received during the first display driving period, but signals received during the touch driving period, so the output of scan signals after the touch driving period cannot be reduced.

FIG. 10 shows an example of a shift register group and a dummy shift register group that constitute the gate driving circuit 120 shown in FIG. 8 according to embodiments of the present disclosure.

Referring to FIG. 10, the first gate driving circuit 121 may include a first shift register group SG1 including a plurality of stages and a first dummy shift register group DSG1 including a plurality of dummy shift registers.

The stages included in the first shift register group SG1 may be provided as much as the number n of the gate lines GL disposed in the first area Area 1 of the touch display panel 110 and each may include a shift register and a buffer.

The dummy shift registers included in the first dummy shift register group DSG1 may be provided as much as the number n of the stages disposed in the first shift register group SG1 and may be disposed positions corresponding to the stages, but are not limited thereto.

The shift register of the last stage included in the first shift register group SG1 is connected to the first dummy shift register included in the first dummy shift register group DSG1. The last dummy shift register included in the first dummy shift register group DSG1 is connected to the shift register of the first stage included in the second shift register group SG2.

Wires connecting the dummy shift registers may be the wires that are not used in the area where the dummy shift registers are disposed, in the gate lines GL, the data lines DL, and the touch lines TL, or wires may be separately provided.

The stages included in the first shift register group SG1 sequentially outputs scan signals to the gate lines GL disposed in the first area Area 1 of the touch display panel 110 during the first display driving period.

The shift register of the last stage of the first shift register group SG1 outputs a signal to the first dummy shift register (or two or more first dummy shift registers) included in the first dummy shift register group DSG1 at the timing at which a scan signal is output to the n-th gate line GL (①).

The first dummy shift register of the first dummy shift register group DSG1 outputs a dummy signal obtained by shifting of the timing of a received signal to the second dummy shift register (②).

In this way, the dummy shift registers included in the first dummy shift register group DSG1 output dummy signals during the touch driving period.

When the n−1-th dummy shift register of the first dummy shift register group DSG1 transmits a signal to the n-th dummy shift register (③), the n-th dummy shift register (or two or more second dummy shift registers) outputs a signal to the first stage of the second shift register group SG2 of the second gate driving circuit 122 immediately before the touch driving period ends (④).

The first stage of the second shift register group SG2 outputs a first scan signal in the second display driving period, using the signal received from the n-th dummy shift register of the first dummy shift register group DSG1 (⑤).

Accordingly, by disposing a dummy shift register group composed of only dummy shift registers in the gate driving circuit 120, making the dummy shift register group output dummy signals during a touch driving period, and using the dummy shift register group to output scan signals when a display driving period is started, the gate driving circuit 120 that can prevent scan signal output reduction that is generated at the LHB boundary can be easily configured.

FIG. 11 shows an example of signals that are output from the stages and the dummy shift registers shown in FIG. 10 according to embodiments of the present disclosure, in which the lengths of a display driving period and a touch driving period are the same.

Referring to FIG. 11, when the n-th stage included in the first shift register group SG1 outputs a scan signal (Gate # n Out) in the first display driving period, the first dummy shift register included in the first dummy shift register group DSG1 receives a start signal (Dummy #1 VST) from the shift register of the n-th stage.

The output signal of the first dummy shift register (Dummy #1 OUT) included in the first dummy shift register group DSG1 is input as a start signal of the second dummy shift register (Dummy #2 VST). In this way, the dummy shift registers output dummy signals during the touch driving period (e.g. The touch driving period is a period when the Touch Sync. is low level).

Further, signals having the same phase and voltage as those of touch driving signals can be applied to the gate lines GL during the touch driving period. By applying signals having the same phase and voltage as those of signals that are applied to the touch electrodes TE are applied to the gate lines GL during the touch driving period, it is possible to prevent capacitance generated between the touch electrodes TE and the gate lines GL from influencing touch sensing.

Since the length of the display driving period and the touch driving period are the same, the number of the dummy shift registers included in the first dummy shift register group DSG1 may be the same as the number of the shift registers included in the first shift register group SG1.

That is, the number of the scan signals that are output from the first shift register group SG1 during the first display driving period and the number of the dummy signals that are output from the first dummy shift register group DSG1 during the touch driving period may be the same.

Accordingly, the first shift register group SG1 and the first dummy shift register group DSG1 can output signals, using clock signals CLK having the same width.

The last dummy shift register of the first dummy shift register group DSG1 outputs a dummy signal such as 1001 immediately before the touch driving period ends.

The signal output from the last dummy shift register is input as a start signal of the first stage included in the second shift register group SG2, such as 1002.

Since the first stage included in the second shift register group SG2 outputs a first scan signal in the second display driving period, using the signal received from the last dummy shift register of the first dummy shift register group DSG1, a scan signal of which the output is not reduced such as 1003 can be output.

Accordingly, it is possible to prevent defect in an image such as horizontal line defect that may be generated by scan signal output reduction on the LHB boundary.

Although the lengths of the display driving period and the touch driving period are the same in the embodiments described above, the lengths of the display driving period and the touch driving period may be different. In this case, if the number of dummy signals output during the touch driving period and the number of scan signals output during the display driving period are the same, it is required to adjust the dummy signals to be output in accordance with the length of the touch driving period.

FIG. 12 shows another example of signals that are output from the stages and the dummy shift registers shown in FIG. 10 according to embodiments of the present disclosure, in which the ration of length of a display driving period and a touch driving period is 2:1.

Referring to FIG. 12, as in the case shown in FIG. 11, the first dummy shift register of the first dummy shift register group DSG1 receives a signal (Dummy #1 VST) from the shift register of the last stage of the first shift register group SG1 at the timing at which the last stage of the first shift register group SG1 outputs a scan signal.

When the touch driving period (e.g. the touch driving period is a period when the Touch Sync. is a low level) is started, the first dummy shift register outputs a dummy signal (Dummy #1 OUT) obtained by shifting of the timing of the input signal, and the dummy signal is input as a start signal of the second dummy shift register (Dummy #2 VST).

The widths of clock signals CLK input from the dummy shift register in the touch driving period are modulated in accordance with the ratio of the display driving period and the touch driving period.

For example, when the ratio of the display driving period and the touch driving period is 2:1, the ratio of the widths of clock signals CLK that the first dummy shift register group DSG1 receives during the first display driving period and the widths of clock signals CLK input during the touch driving period is 2:1.

That is, the first dummy shift register group DSG1 receives clock signals CLK of which the widths are modulated during the touch driving period in accordance with the ratio of the lengths of the display driving period and the touch driving period, so it can output dummy signals to fit to the length of the touch driving period.

The widths of the clock signals CLK input to the first shift register group SG1 and the second shift register group SG2 during the touch driving period can also be modulated in the same way.

Therefore, according to embodiments of the present disclosure, since the dummy shift registers output dummy signals during the touch driving period, using clock signals CLK the same as clock signals CLK that are used to output scan signals and the widths of clock signals CLK are modulated in accordance with the ratio of the display driving period and the touch driving period, dummy signals can be output to fit to the touch driving period.

FIGS. 13 and 14 show other examples of the stages and dummy shift registers constituting the gate driving circuit shown in FIG. 8 according to embodiments of the present disclosure.

Referring to FIG. 13, shift registers constituting the first shift register group SG1 of the first gate driving circuit 121 are arranged adjacent to each other. Dummy shift registers constituting the first dummy shift register group DSG1 are disposed adjacent to each other in an area except for the area where the shift registers constituting the first shift register group SG1.

Accordingly, the wires connecting the shift registers of the first shift register group SG1, the wires connecting the dummy shift registers of the first dummy shift register group DSG1, and the wires connecting the shift registers and the dummy shift registers to each other at the boundary between the first shift register group SG1 and the first dummy shift register group DSG1 cannot be disposed without overlapping each other.

The wires connecting the shift registers and buffers constituting the first shift register group SG1 to each other are sequentially arranged, so they can be arranged without overlapping each other.

Therefore, wires that are added in accordance with the first dummy shift register group DSG1 can be easily formed.

FIG. 14 shows an example of a structure in which stages and dummy shift registers are disposed when the lengths of the display driving period and the touch driving period are not the same.

Referring to FIG. 14, shift registers constituting the first shift register group SG1 are disposed adjacent to each other and dummy shift registers constituting the first dummy shift register group DSG1 are disposed adjacent to each other in the other area.

The ratio of the number of the shift registers constituting the first shift register group SG1 and the number of dummy shift registers constituting the first dummy shift register group DSG1 may be the same as the ratio of the lengths of the display driving period and the touch driving period.

For example, when the ratio of the lengths of the display driving period and the touch driving period is 2:1, the ratio of the number of the shift registers of the first shift register group SG1 and the number of the dummy shift registers of the first dummy shift register group DSG1 can be 2:1.

Accordingly, when the lengths of the display driving period and the touch driving period are not the same, it is possible to output dummy signals to fit to the touch driving period by modulating clock signals CLK that are input during the touch driving period or it is also possible to output dummy signals to fit to the touch driving period without modulating clock signals CLK by adjusting the number of the dummy shift registers.

FIG. 15 shows the process of a method for driving the gate driving circuit 120 according to embodiments of the present disclosure.

Referring to FIG. 15, the first gate driving circuit 120 sequentially outputs scan signals to the first gate lines GL disposed in the first area Area 1 of the touch display panel 110 or to the gate lines GL of the first group during a first display driving period (S1500).

The gate driving circuit 120 outputs dummy signals during the touch driving period after the first display driving period (S1510).

The dummy signals can be output by a plurality of dummy shift registers included in the gate driving circuit 120. For example, it is possible to output dummy signals during the touch driving period, using a signal input immediately before the first display driving period ends.

The dummy signals are transmitted through the dummy shift registers and can be input to a stage that outputs a scan signal in the second display driving period immediately before the touch driving period ends.

The gate driving circuit 120 sequentially outputs scan signals to the gate lines GL disposed in the second area Area 2 of the touch display panel 110 or to the gate lines GL of the second group during the second display driving period (S1520).

The gate driving circuit 120 output scan signals, using a signal received immediately before the second display driving period is started, so it is possible to prevent reduction of the output of scan signals at the boundary between the touch driving period and the display driving period.

According to the embodiments of the present disclosure described above, it is possible to secure a sufficient period for touch sensing by inserting a touch driving period between display driving periods.

Further, by transmitting a signal output immediately before a previous display driving period ends, through a dummy shift register during a touch driving period and by inputting the signal to a stage immediately before the next display driving period is started to be used to output a scan signal, it is possible to prevent reduction of the output of a scan signal at the boundary between a touch driving period and a display driving period.

Further, by using dummy shift registers that transmit signals during a touch driving period, it is possible to easily configure a circuit for preventing output reduction of a scan signal, using clock signals CLK for outputting scan signals without adding a specific signal.

Therefore, the output of a scan signal is not reduced at the boundary between a touch driving period and a display driving period, so defect in an image such as horizontal line defect due to scan signal output reduction can be prevented.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary embodiments of the present disclosure have been described for the sake of brevity and clarity. The scope of the present disclosure shall be construed on the basis of the accompanying claims in such a manner that all of the technical ideas included within the scope equivalent to the claims belong to the present disclosure.

What is claimed is:

1. A touch display device comprising:
a plurality of gate lines; and
a gate driving circuit configured to drive the plurality of gate lines,
wherein the gate driving circuit comprises:
a first shift register group sequentially outputting scan signals to gate lines of a first group of the plurality of gate lines during a first display driving period;
a dummy shift register group receiving one or more signals output from the first shift register group and outputting dummy signals during a touch driving period after the first display driving period; and
a second shift register group receiving one or more signals output from the dummy shift register group and sequentially outputting scan signals to gate lines of a second group of the plurality of gate lines during a second display driving period after the touch driving period,
wherein widths of the scan signals output from the first shift register group are different from widths of the dummy signals output from the dummy shift register group.

2. The touch display device of claim 1, wherein the dummy shift register group receives the one or more signals output from the first shift register group before the first display driving period ends, and outputs the one or more signals to the second shift register group before the touch driving period ends.

3. The touch display device of claim 1, wherein the dummy shift register group receives the one or more signals output from the first shift register group through one or more first dummy shift registers, outputs the one or more signals to the second shift register group through one or more second dummy shift registers, and outputs the dummy signals obtained by shifting of timings of the one or more signals received through the one or more first dummy shift registers during the touch driving period.

4. The touch display device of claim 1, wherein a number of shift registers included in the first shift register group and a number of dummy shift registers included in the dummy shift register group are the same, and
widths of clock signals received by the first shift register group and the second shift register group and widths of clock signals received by the dummy shift register group, during the touch driving period, are different.

5. The touch display device of claim 1, wherein a ratio of a shifting interval of the scan signals output from the first shift register group and a shifting interval of the dummy signals output from the dummy shift register group are the same as a ratio of the first display driving period and the touch driving period.

6. A touch display device comprising:
a touch display panel including a plurality of gate lines, a plurality of touch lines, and a plurality of touch electrodes thereon; and
a gate driving circuit outputting scan signals to the plurality of gate lines,
wherein the gate driving circuit comprises a shift register group sequentially outputting scan signals to the plurality of gate lines while a display driving voltage is applied to the touch display panel, and a dummy shift register group sequentially outputting dummy signals while touch driving signals are applied to the plurality of touch electrodes,
wherein widths of the scan signals output from the shift register group are different from widths of the dummy signals output from the dummy shift register group.

7. The touch display device of claim 6, wherein the dummy signals are not applied to the touch display panel.

8. The touch display device of claim 6, wherein
the dummy shift register group receives one or more signals output from one or more shift registers included in the shift register group during a period in which the display driving voltage is applied to the touch display panel, and outputs the dummy signals while the touch driving signals are applied to the plurality of touch electrodes.

9. The touch display device of claim 8, wherein the shift register group comprises:
a first shift register group outputting the scan signals to gate lines disposed in a first area of the touch display panel; and
a second shift register group outputting the scan signals to gate lines disposed in a second area of the touch display panel, and
the second shift register group outputs scan signals to the gate lines disposed in the second area, using one or more signals output from one or more dummy shift registers included in the dummy shift register group.

10. A gate driving circuit comprising:
a shift register group sequentially outputting scan signals to some of a plurality of gate lines disposed on a touch display panel during a display driving period; and
a dummy shift register group receiving one or more signals output from the shift register group and outputting dummy signals during a touch driving period after the display driving period,
wherein widths of the scan signals output from the shift register group are different from widths of the dummy signals output from the dummy shift register group.

11. The gate driving circuit of claim 10, wherein the dummy shift register group outputs the dummy signals obtained by shifting of a timing of the one or more signals received from the shift register group, during the touch driving period.

12. The gate driving circuit of claim 10, wherein a number of shift registers included in the shift register group and a number of dummy shift registers included in the dummy shift register group are the same,
a ratio of a shifting interval of the scan signals output from the shift register group and a shifting interval of the dummy signals output from the dummy shift register group is the same as a ratio of the display driving period and the touch driving period and
widths of clock signals received by the shift register group and widths of clock signals received by the dummy shift register group, during the touch driving period, are different.

13. The gate driving circuit of claim 10, wherein a first dummy shift register included in the dummy shift register group is connected to a last shift register included in the shift register group, and a last dummy shift register included in the dummy shift register group is connected to a first shift register included in another shift register group different from the shift register group.

14. A method for driving a gate driving circuit, the method comprising:
- sequentially outputting scan signals to two or more gate lines disposed in a first area of a touch display panel during a first display period;
- sequentially outputting dummy signals during a touch driving period after a first display driving period; and
- sequentially outputting scan signals to two or more gate lines disposed in a second area of the touch display panel during a second display driving period after the touch driving period,
- wherein widths of the scan signals are different from widths of the dummy signals.

15. The method of claim 14, wherein one or more scan signals of the scan signals output during the second display driving period are output, using one or more dummy signals output before or after the touch driving period ends.

* * * * *